US012726778B2

(12) United States Patent
Van Damme et al.

(10) Patent No.: US 12,726,778 B2
(45) Date of Patent: Sep. 1, 2026

(54) METHOD OF ASSEMBLING A LOUDSPEAKER AND VOICE COIL FORMER FOR USE THEREIN

(71) Applicant: PSS BELGIUM NV, Dendermonde (BE)

(72) Inventors: Arthur Van Damme, Dendermonde (BE); David Corynen, Dendermonde (BE)

(73) Assignee: PSS BELGIUM NV, Dendermonde (BE)

( * ) Notice: Subject to any disclaimer, the term of this patent is extended or adjusted under 35 U.S.C. 154(b) by 157 days.

(21) Appl. No.: 18/861,383

(22) PCT Filed: May 15, 2023

(86) PCT No.: PCT/EP2023/062986
§ 371 (c)(1),
(2) Date: Oct. 29, 2024

(87) PCT Pub. No.: WO2023/222609
PCT Pub. Date: Nov. 23, 2023

(65) Prior Publication Data

US 2025/0287166 A1 Sep. 11, 2025

(30) Foreign Application Priority Data

May 17, 2022 (GB) ...................................... 2207213

(51) Int. Cl.
*H04R 9/06* (2006.01)
*H04R 1/06* (2006.01)
(Continued)

(52) U.S. Cl.
CPC ............. *H04R 31/006* (2013.01); *H04R 1/06* (2013.01); *H04R 9/046* (2013.01); *H04R 9/06* (2013.01); *H04R 2400/11* (2013.01)

(58) Field of Classification Search
CPC . H04R 1/06; H04R 9/046; H04R 9/06; H04R 31/006; H04R 2400/11; H01F 41/10; H01F 5/02; H01F 7/066
See application file for complete search history.

(56) References Cited

U.S. PATENT DOCUMENTS

| | | | | |
|---|---|---|---|---|
| 5,014,323 A * | 5/1991 | Markow | ................ | H04R 9/045<br>381/409 |
| 5,583,944 A | 12/1996 | Morohoshi | | |

(Continued)

FOREIGN PATENT DOCUMENTS

| | | |
|---|---|---|
| CN | 106878879 B | 10/2019 |
| JP | 3596121 B2 | 12/2004 |

(Continued)

OTHER PUBLICATIONS

ISA/EP, International Search Report and Written Opinion for corresponding PCT Patent Application No. PCT/EP2023/062986, mailed Aug. 22, 2023, 11 pages.

*Primary Examiner* — Huyen D Le
(74) *Attorney, Agent, or Firm* — NK Patent Law

(57) ABSTRACT

A method of assembling a loudspeaker including providing a precursor loudspeaker. The precursor loudspeaker includes a chassis and a voice coil former. The chassis includes a first electrical terminal and a second electrical terminal. A voice coil is mounted on the voice coil former. A first end of a flexible wire is attached to the voice coil former and electrically connected to a first end of the voice coil, and a second end of the flexible wire is attached to the voice coil former and electrically connected to a second end of the voice coil such that the flexible wire forms the loop of wire which extends outwardly from the voice coil former. The method further includes attaching the loop of wire to the first electrical terminal at a first location on the loop of wire and
(Continued)

attaching the loop of wire to the second electrical terminal at a second location on the loop of wire.

15 Claims, 8 Drawing Sheets

(51) Int. Cl.

| | |
|---|---|
| ***H04R 9/04*** | (2006.01) |
| ***H04R 31/00*** | (2006.01) |

(56) References Cited

U.S. PATENT DOCUMENTS

| | | | | |
|---|---|---|---|---|
| 6,922,477 | B1 | 7/2005 | Ikeyama | |
| 7,460,682 | B2 * | 12/2008 | Suzuki | H04R 9/046<br>381/409 |
| 9,674,595 | B2 | 6/2017 | Ara | |
| 2020/0245072 | A1 | 7/2020 | Miyamoto et al. | |
| 2025/0203260 | A1 * | 6/2025 | Takeda | H04R 9/025 |

FOREIGN PATENT DOCUMENTS

| | | | |
|---|---|---|---|
| WO | 2019073948 | A1 | 4/2019 |
| WO | 2021005091 | A1 | 1/2021 |

* cited by examiner

METHOD OF ASSEMBLING A LOUDSPEAKER AND VOICE COIL FORMER FOR USE THEREIN

CROSS-REFERENCE TO RELATED APPLICATIONS

This application is a U.S. National Stage Application of International Patent Application No. PCT/EP2023/062986, filed May 15, 2023, which claims priority to United Kingdom Patent Application No. 2207213.6, filed May 17, 2022, the entire contents of all of which are incorporated herein by reference.

FIELD OF THE INVENTION

The present invention relates to a method of assembling a loudspeaker and to a voice coil former for a loudspeaker.

BACKGROUND

A conventional loudspeaker (such as described in JP3596121B2) typically includes a frame, a diaphragm, and a drive unit configured to move the diaphragm along a movement axis. A typical drive unit is an electromechanical drive unit that includes a magnet unit which is configured to produce a magnetic field in an air gap, and a voice coil winding mounted on a voice coil former which is in-turn attached to the diaphragm. The voice coil is configured to sit in the air gap when the diaphragm is at rest. When the loudspeaker is in use, the voice coil is energized (e.g. by having the electrical signal pass through it) to produce a magnetic field which interacts with the magnetic field produced by the magnet unit. This causes the voice coil (and therefore the diaphragm) to move relative to the magnet unit along the movement axis such that the diaphragm radiates sound.

The electrical signal is typically conducted from a terminal located in the frame to the voice coil by flexible lead wires. The lead wires are attached at one end to the fixed (non-moving) portion to the loudspeaker and attached at the other end to the moving portion of the speaker (including the diaphragm and voice coil). Therefore, the lead wires are required to be flexible and durable.

Typically, the voice coil and voice coil former are provided, prior to assembly of the remainder of loudspeaker, with the lead wires attached to the voice coil as shown in FIG. 2. When assembling the loudspeaker, the lead wires are then physically and electrically connected to electrical terminals provided in the loudspeaker frame.

However, to connect the lead wires to the electrical terminals the lead wires must first be located and their ends positioned in proximity to the appropriate terminal. locating and positioning the lead wires is a challenging and time-consuming stage of the loudspeaker assembly because the locations of the lead wire ends are unpredictable owing to the flexible design of the lead wires.

Existing methods used by the present applicant involve finding and positioning the lead wire ends by connecting the lead wires to a nylon rod which is used to manipulate the position of the lead wires. This nylon rod results in it being easier to locate and position the lead wire ends. However, the use of this rigid element results in additional costs and complexity when assembling the loudspeaker. U.S. Pat. No. 9,674,595B2 describes a loudspeaker with an intermediate fixation of the lead wires.

The present invention has been devised in light of the above considerations.

SUMMARY OF THE INVENTION

Accordingly, a first aspect of the present invention provides:

a method of assembling a loudspeaker, the method including:

providing a precursor loudspeaker that includes:

- a chassis, including a first electrical terminal and a second electrical terminal; and
- a voice coil former, wherein a voice coil is mounted on the voice coil former, wherein a first end of a flexible wire is attached to the voice coil former and electrically connected to a first end of the voice coil, and a second end of the flexible wire is attached to the voice coil former and electrically connected to a second end of the voice coil such that the flexible wire forms a loop of wire which extends outwardly from the voice coil former; and then attaching the loop of wire to the first electrical terminal at a first location on the loop of wire and attaching the loop of wire to the second electrical terminal at a second location on the loop of wire.

Advantageously, providing a loop of wire can make it easier to locate and manipulate the flexible wire than if separate free wire ends were used to achieve the same effect. Likewise, attaching the loop of wire to the first and second electrical terminals can be performed more easily than attaching separate free wire ends to the first and second electrical terminals. As a result, assembly of the loudspeaker may be performed more efficiently and reliably saving time and cost during production.

The flexible wire is preferably a single length of wire which is formed as one unitary length of wire, i.e. rather than separate wires joined, at their ends, with additional material, glue or a connector part.

The voice coil former and voice coil may be part of a drive unit. The drive unit may be an electromagnetic drive unit that includes a magnet unit configured to produce a magnetic field in an air gap, and a voice coil attached to a diaphragm, wherein the voice coil is configured to sit in the air gap when the diaphragm is at rest. When the loudspeaker is in use, the voice coil may be energized (e.g. by having an electrical signal pass through it) to produce a magnetic field which interacts with the magnetic field produced by the magnet unit and which causes the voice coil (and therefore the diaphragm) to move along a movement axis relative to the magnet unit. Such drive units are well known.

The first and second electrical terminals may be positioned on the chassis in locations which are radially outward of the voice coil former with respect to the movement axis.

The chassis may be a frame. The frame may be mountable in an enclosure. Alternatively, the chassis may be an enclosure.

The method may include cutting the loop of wire between the first and second locations on the loop of wire after attaching the loop of wire to the first and second electrical terminals.

This step of cutting could be a convenient way to prevent the loop of wire from forming a short-circuit across the first and second ends of the voice coil.

In some examples, the method may include adapting the flexible wire such that the loop of wire has a non-conductive section between the first and second locations. For example, the method may include etching away conductive parts of the flexible lead wire between the first and second locations on the loop of wire. In these examples the loop of wire need not be cut to remove a short circuit between the first and second ends of the voice coil.

The adapting of the flexible wire (to have a non-conductive section between the first and second locations) may take place before or after the voice coil former and loop of wire is installed in the chassis. Before is preferable because this can facilitate the testing of electrical performance of the voice coil (e.g. by a voice coil manufacturer) before the voice coil former is installed in the chassis.

In some examples, the method may include adapting, for example by etching, the flexible wire to have a non-conductive section after the loop of wire is attached to the first and second electrical terminals to remove a short-circuit between the first and second ends of the voice coil.

Attaching the loop of wire to the first electrical terminal at a first location on the loop of wire and attaching the loop of wire to the second electrical terminal at a second location on the loop of wire may include:

(i) positioning the loop in relation to the first and second electrical terminals such that the loop of wire is in contact with the first electrical terminal at the first location on the loop of wire and such that the loop of wire is in contact with the second electrical terminal at the second location on the loop of wire; and (ii) attaching the loop of wire to the first electrical terminal at the first location on the loop of wire to form an electrical connection between the loop of wire and the first electrical terminal, and attaching the loop of wire to the second electrical terminal at the second location on the loop of wire to form an electrical connection between the loop of wire and the second electrical terminal.

The positioning may be performed using a manipulation tool. This can make it easier and quicker to manipulate the loop of wire inside the confines of the loudspeaker chassis. But it would also be possible to manipulate the loop of wire by hand.

The manipulation tool may be configured to apply tension to the loop of wire when positioning the loop in relation to the first and second electrical terminals. In this way, a portion of the loop of wire can be pulled taught which makes it easier to bring that portion into contact with the first and second electrical terminals in the loudspeaker chassis. In this way, the manipulation of the loop of wire can be performed in a manner that is repeatable since it is easier to bring a taught portion of the loop of wire into contact with both the first and second terminals. This is particularly beneficial when the flexible wire may vary in length owing to manufacturing tolerances.

The manipulation tool may include a first hook and a second hook. The first hook and second hook may be biased apart from each other to apply tension to the loop of wire (including a portion of the loop of wire extending between the first and second hooks, which may be pulled into a straight line by the tension). Advantageously, hooks provide a simple and efficient means to locate and manipulate the loop of wire in a repeatable manner.

The hooks may be biased apart from each other by a biasing means which is configured to apply a predetermined tension to the loop of wire. This can help the loop of wire to be manipulated in a repeatable manner even if the loop of wire varies in length.

In other examples, the hooks may be biased apart by a biasing means which is configured to move the hooks apart from each other by a set distance. This can help the loop of wire to be manipulated into a repeatable shape which fits inside the loudspeaker chassis and can be brought into contact with the first and second electrical terminals.

Other manipulation tools may be envisaged by a skilled person reading this disclosure.

Positioning the loop may include: inserting at least a portion of the manipulation tool into the loop of wire and then using the manipulation tool to manipulate the loop of wire, wherein when the manipulation tool is being inserted into the loop of wire the manipulation tool is held in an insertion configuration, and when manipulating tool is manoeuvring the loop of wire is it in a tensioning configuration.

Preferably, when the manipulation tool is in the insertion configuration, the maximal width of the at least a portion of the manipulation tool inserted into the loop of wire as measured in a direction perpendicular to the movement axis is smaller than when the manipulation tool is in the tensioning configuration (said direction may be parallel to an axis extending between the first and second electrical terminals). More preferably, when the manipulation tool is in the insertion configuration, the maximal width of the at least a portion of the manipulation tool inserted into the loop of wire as measured in a direction perpendicular to the movement axis is smaller than the maximal width of the voice coil former as measured in that direction (said direction may be parallel to an axis extending between the first and second electrical terminals). This can help to make the locating and manipulating of the loop of wire more repeatable and efficient since it is easier to insert the manipulating tool into the loop of wire if it is small in a direction perpendicular to the movement axis.

If the manipulation tool includes first and second hooks, the first and second hooks may be closer together in the insertion configuration than in the tensioning configuration.

In some examples, the manipulation tool may be brought into the insertion configuration by another means. For example, the manipulation tool may be rotated into the insertion configuration before insertion into the loop of wire.

The manipulation tool may be configured to perform substantially identical movements for each of a plurality of loudspeakers being assembled. This may be facilitated by the tensioning ability of the manipulation tool which can help the manipulating tool accurately position different loops of wire in relation to terminals, even if the loops of wire have different lengths or positions, e.g. due to manufacturing tolerances.

Attaching the loop of wire to the first and second electrical terminals may involve any appropriate technique for forming an electrical connection between the loop of wire and the first and second electrical terminals. For example, the loop of wire may be soldered or clamped or glued to the first and/or second electrical terminals.

In some examples, the loop of wire may be electrically conductive on its outer surface, which may facilitate the forming of an electrical connection between the loop of wire and the first and second electrical terminals. In other examples, the loop of wire may include an electrically non-conductive outer surface (e.g. a non-conductive sheath), in which case an electrically conductive inner portion of the loop of wire may be exposed (e.g. by stripping or etching the loop of wire at one or more relevant locations on the loop of wire) prior to attaching the loop of wire at the first and second electrical terminals.

In some examples, the first electrical terminal may include an upstanding portion extending at least partly in the direction of the movement axis of the loudspeaker. Positioning the loop in relation to the first electrical terminal may include manoeuvring the loop of wire over the upstanding portion and attaching the loop of wire to the first electrical terminal may include manipulating the upstanding portion of the first terminal to clamp the loop of wire in the first terminal.

In some examples, the second electrical terminal may include an upstanding portion extending at least partly in the direction of the movement axis of the loudspeaker. Positioning the loop in relation to the second electrical terminal may include manoeuvring the loop of wire over the upstanding portion and attaching the loop of wire to the second electrical terminal may include manipulating the upstanding portion of the second electrical terminal to clamp the loop of wire in the second terminal.

Manoeuvring the loop of wire over an upstanding portion may include manoeuvring the loop of wire with the manipulation tool to lift it over the upstanding portion.

The loop of wire may be manoeuvred over the upstanding portion of the first electrical terminal and then the loop of wire may be manoeuvred over the upstanding portion of the second electrical terminal. Conveniently, the loop of wire may be manoeuvred over the upstanding portion of the first electrical terminal and the upstanding portion of the second electrical terminal at the same time.

The upstanding portion(s) of the first and/or second electrical terminal(s) may also extend in a radially outward direction with respect to the movement access. This can help to secure the loop of wire in the proximity of electrical terminal(s) prior to attaching the loop of wire to the electrical terminal(s) (by clamping it or by other means).

Conveniently, the loop of wire may be attached to the first and second terminals prior to the installation of the diaphragm of the loudspeaker. But in some examples, the loop of wire may be attached to the first and second terminals after the diaphragm is installed.

The flexible wire may be made from flexible fibres which are braided together. The flexible fibres may be non-conductive and coated in a conductive wrapping before being braided together, thereby having an electrically conductive outer surface. In this example, the conductive wrapping coating the flexible fibres may be removed from part of the flexible wire, for example by etching.

A second aspect of the present invention may provide a voice coil former, wherein a voice coil is mounted on the voice coil former, wherein a first end of a flexible wire is attached to the voice coil former and electrically connected to a first end of the voice coil, and a second end of the flexible wire is attached to the voice coil former and electrically connected to a second end of the voice coil such that the flexible wire forms a loop of wire which extends outwardly from the voice coil former.

The invention includes the combination of the aspects and preferred features described except where such a combination is clearly impermissible or expressly avoided. In particular, any feature pertaining to the voice coil former and/or voice coil described in relation to the first aspect may be applied to the second aspect.

SUMMARY OF THE FIGURES

Embodiments and experiments illustrating the principles of the invention will now be discussed with reference to the accompanying figures in which.

DETAILED DESCRIPTION OF THE INVENTION

Figure 1:
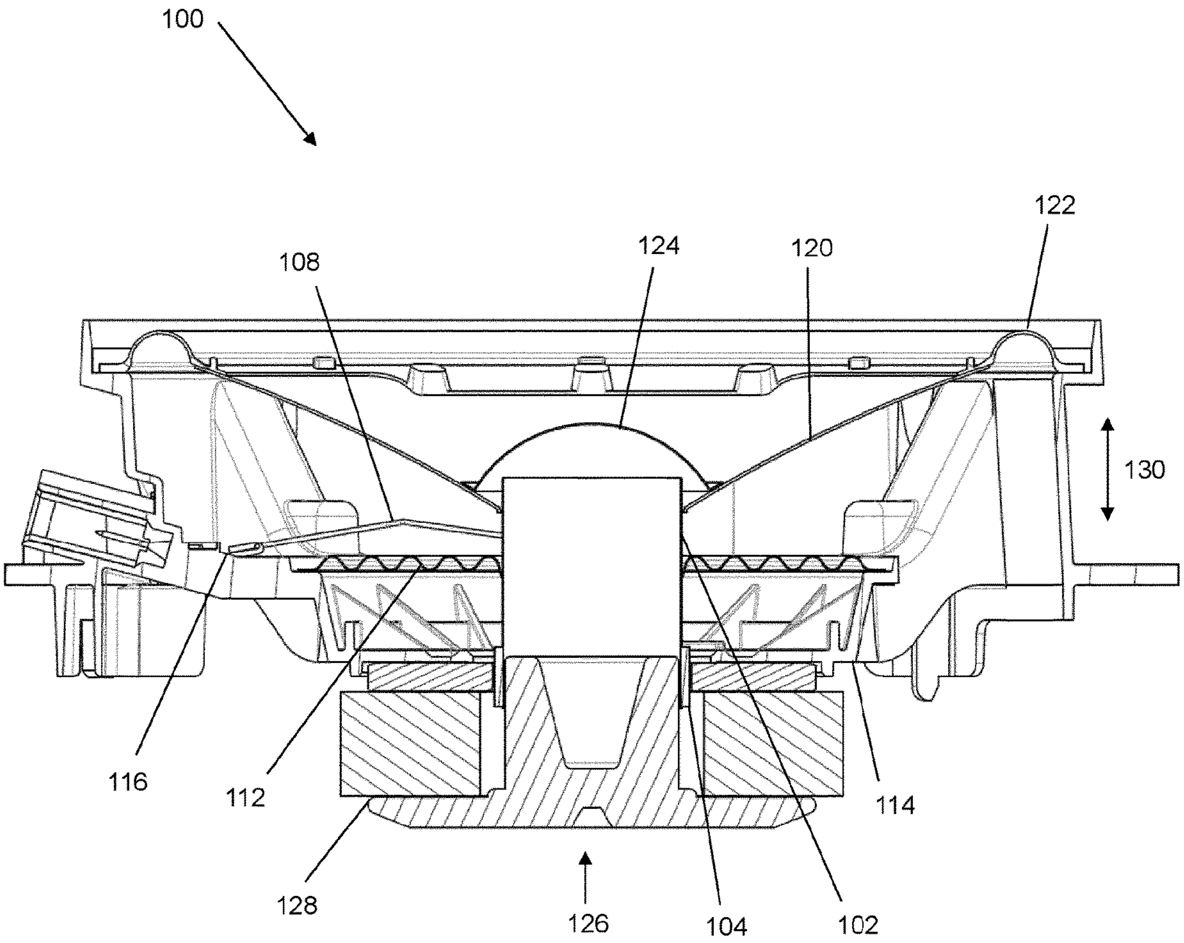
FIG. 1 shows a cross-section view of an assembled loudspeaker.

Aspects and embodiments of the present invention will now be discussed with reference to the accompanying figures. Further aspects and embodiments will be apparent to those skilled in the art. All documents mentioned in this text are incorporated herein by reference.

In the examples that follow, alike features have been given corresponding reference numerals, and corresponding descriptions may apply except where such a description is clearly impermissible or expressly avoided.

FIG. 1 shows a cross-section view of an assembled loudspeaker 100.

The loudspeaker 100 includes a frame 114, a diaphragm 120, lead wires 108 (only one shown), and a drive unit 126.

The diaphragm 120 is suspended from the frame 114 by suspension elements. In this example, the diaphragm 120 is a suspended by two suspension elements including a damper 112 (which may also be referred to as a "spider") and a surround 122 (which may also be referred to as a "roll suspension" or "roll edge").

The drive unit 126 is configured to move the diaphragm 120 along a movement axis 130 based on an electrical signal supplied by the lead wires 108. In this example, the drive unit 126 is an electromechanical drive unit comprising a magnet unit 128 and a voice coil 104 mounted on a voice coil former 102. The magnet unit is configured to produce a magnetic field in an air gap and the voice coil former 102 is mechanically connected to the diaphragm 120. The voice coil 104 is configured to sit in the air gap when the diaphragm 120 is at rest. When the loudspeaker 100 is in use, the voice coil 104 is energized (e.g. by having the electrical signal pass through it) to produce a magnetic field which interacts with the magnetic field produced by the magnet unit 128. This causes the voice coil 104 (and therefore the diaphragm 120) to move relative to the magnet unit 128 along the movement axis 130 such that the diaphragm 120 radiates sound in both forward and rear directions parallel to the movement axis 130.

The lead wires 108 conduct the electrical signal from electrical terminals 116 (only one shown) mounted in the fixed (non-moving) frame 114 to the voice coil 104 mounted on the non-stationary (moving) voice coil former 102. Thus, the lead wires 108 are required to be flexible and durable. In this example, the lead wires 108 consist of multiple strands made of a fibre core surrounded by a conductive wrapping. These strands are then braided to form a strong and flexible lead wire 108 that retains its shape.

Figure 2:
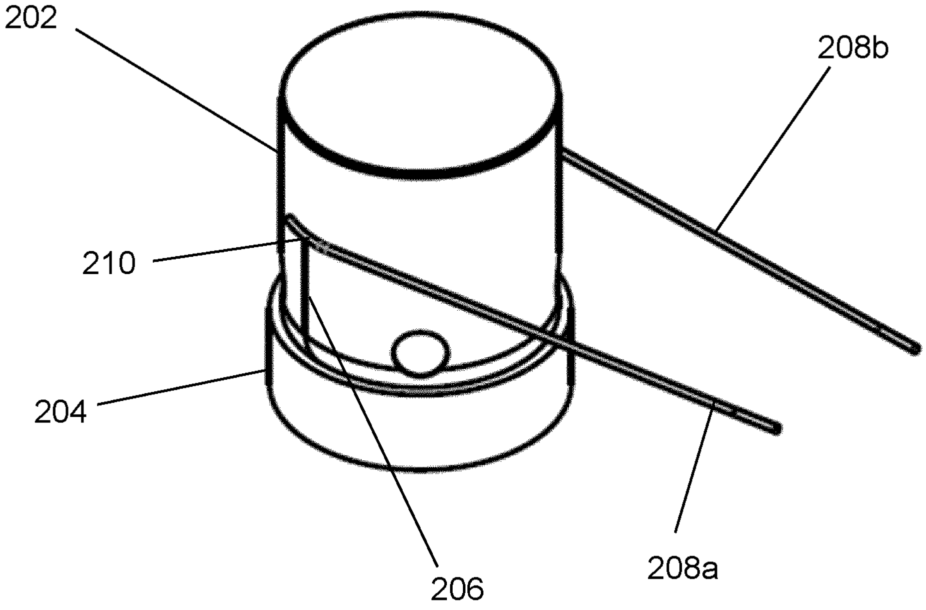
FIG. 2 shows a perspective view of a voice coil former for assembly of a loudspeaker using conventional methods.

FIG. 2 shows a perspective view of a voice coil former 202 for assembling a loudspeaker (such as the loudspeaker 100 shown in FIG. 1) using conventional methods.

A voice coil 204 formed of conducting wire is mounted on the voice coil former 202. Outlet wires 206 of first and second ends of the voice coil 204 are connected to solder pads 210. A first lead wire 208*a* and a second lead wire 208*b* are attached to the voice coil former 202 and electrically connected to the outlet wires 206 of the voice coil 204 on the solder pads 210. The distal ends of the first and second lead wires 208 are left free to be connected to the electrical terminals in the loudspeaker frame when the loudspeaker is being assembled later.

When the loudspeaker is assembled, the voice coil former 202 is positioned in the air gap of the magnet unit. Next, the free ends of the lead wires 208*a* 208*b* are physically and electrically connected to the aforementioned electrical terminals provided in the loudspeaker frame. However, the free ends of the lead wires must first be located and their ends positioned in proximity to the electrical terminals. Locating and positioning the lead wires can be challenging and time-consuming adding cost and time to loudspeaker production.

Figure 3:
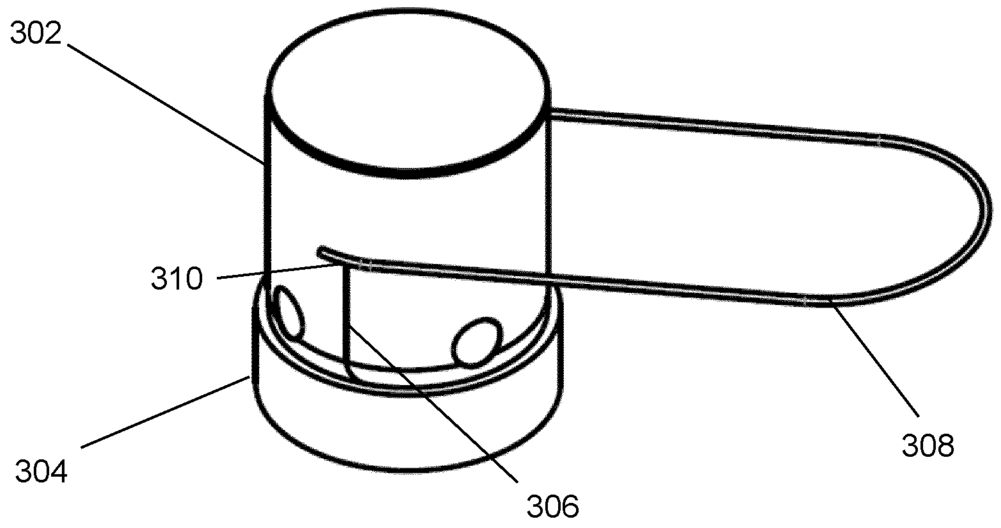
FIG. 3 shows a perspective view of a voice coil former for assembly of a loudspeaker according to the present invention.

FIG. 3 shows a perspective view of a voice coil former 302 for assembling a loudspeaker according to the present invention.

A voice coil 304 is mounted on the voice coil former 302 and a first end of a flexible lead wire 308 is attached to the voice coil former 302 and electrically connected to a first end of the voice coil 304. A second end of the flexible lead wire 308 is attached to the voice coil former 302 and electrically connected to a second end of the voice coil 304 such that the flexible wire forms a loop of wire 308 which extends outwardly from the voice coil former 302.

By replacing two separate lead wires on the voice coil former as shown in FIG. 2 with a loop of wire 308 a short circuit is deliberately created across the voice coil 304. However, the present inventor has observed that this closed lead wire design helps to make the assembly of loudspeakers more efficient because the loop of wire 308 is easier to locate and manipulate inside the loudspeaker frame. This is aided by the fact that tension may be applied to the loop of wire 308 from inside the loop.

FIGS. 4*a*-4*e* show perspective views of a loudspeaker being assembled using the voice coil former shown in FIG. 3. In particular, FIGS. 4*a*-4*e* show a stage of the loudspeaker assembly where the loop of wire is positioned relative to and attached to the electrical terminals located in the frame.

Figure 4A:
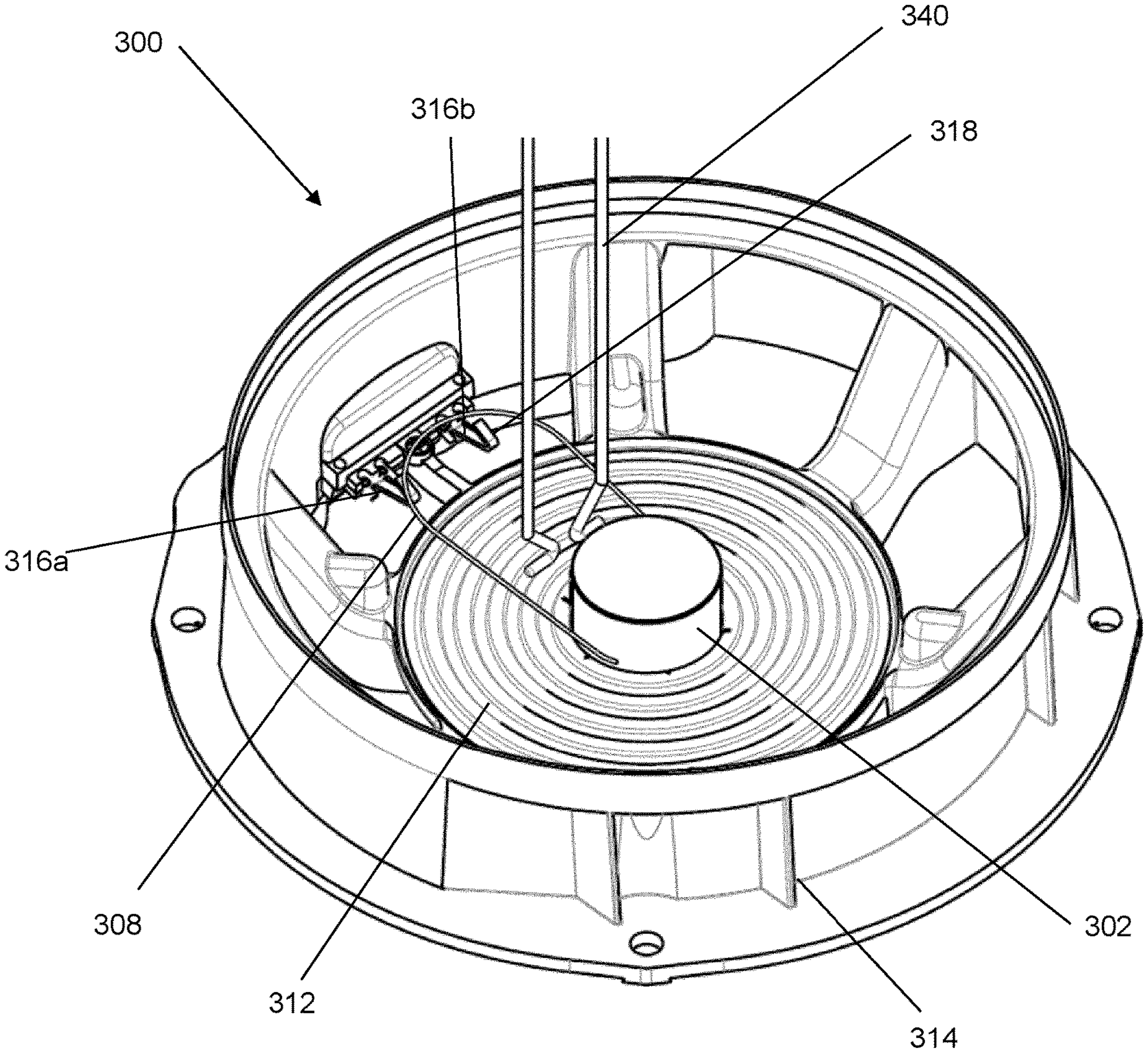
FIGS. 4*a*-4*e* show perspective views of a loudspeaker being assembled according to the present invention.

FIG. 4*a* shows a precursor loudspeaker 300 that includes a frame 314, including a first electrical terminal 316*a* and a second electrical terminal 316*b*, a damper 312, and a voice coil former 302 as shown in FIG. 3. The precursor loudspeaker 300 does not yet contain a diaphragm.

A voice coil is mounted on the voice coil former 302. A first end of a flexible wire is attached to the voice coil former 302 and electrically connected to a first end of the voice coil, and a second end of the flexible wire is attached to the voice coil former 302 and electrically connected to a second end of the voice coil such that the flexible wire forms a loop of wire 308 which extends outwardly from the voice coil former 302.

The length of the loop of wire 308 is determined by the distance from the outlet wires of the voice coil to the electrical terminals and the mechanical stroke of the loudspeaker. Preferably, the length of the loop of wire 308 is greater than the sum of the distance of each outlet wire of the voice coil to its respective electrical terminal, the distance between the first and second electrical terminals, and a distance included to accommodate the mechanical stroke of the loudspeaker. This ensures the loop of wire 308 can be attached to the electrical terminals during assembly and will have sufficient length remaining after assembly to allow the voice coil former 302 to move across its full extent when the loudspeaker is in use.

A manipulation tool 340 is provided to position the loop of wire 308. In this example, the manipulation tool 340 includes first and second hooks. The manipulation tool 340 is shown in an insertion configuration whereby the first and second hooks are held together to fit inside the loop of wire 308.

Figure 4B:
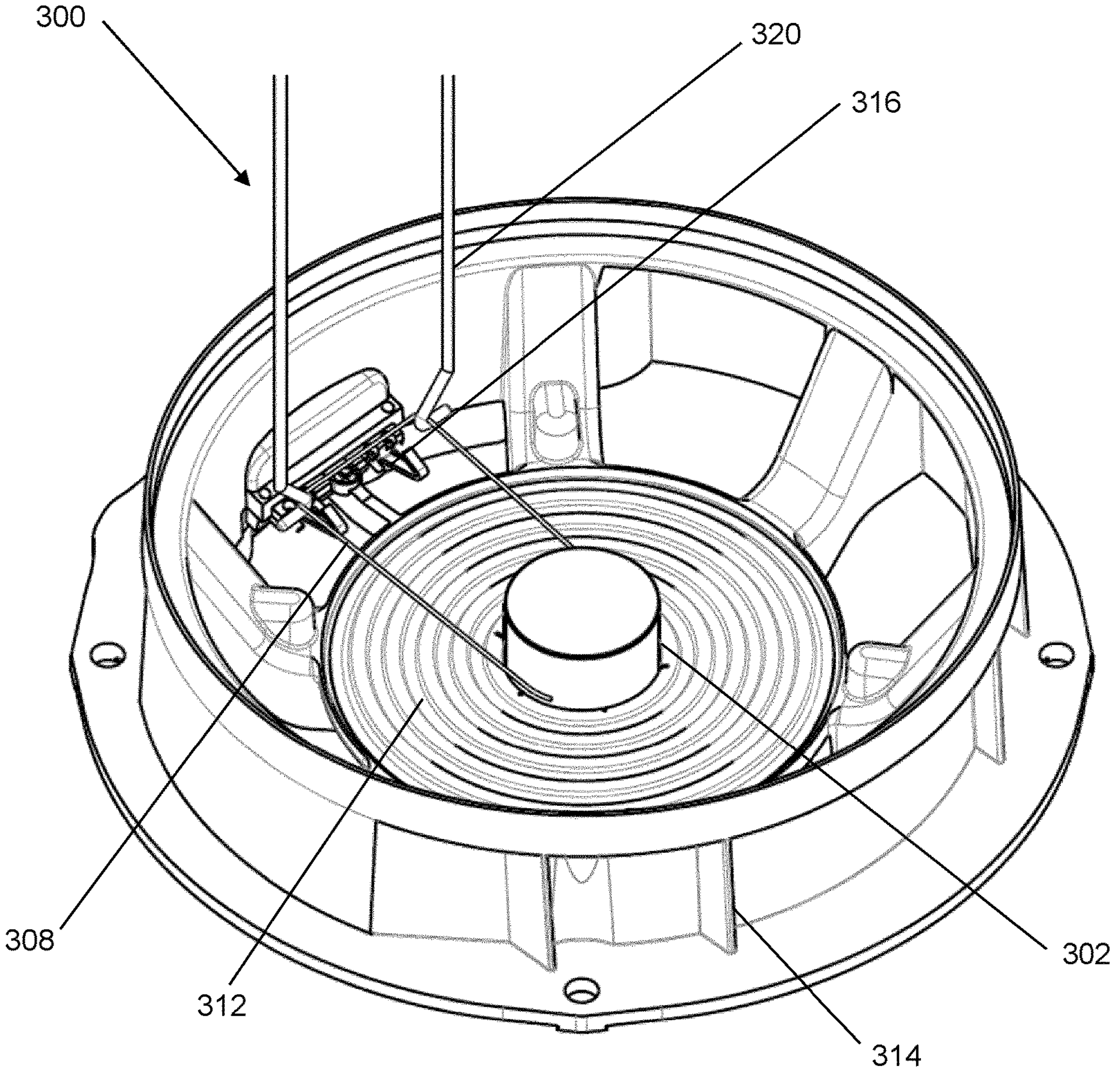

FIG. 4*b* shows the precursor loudspeaker 300 of FIG. 4*a* wherein the manipulation tool 340 has been moved into a tensioning configuration. In this example, the tensioning configuration involves the first and second hooks being biased apart such that tension is applied to the inside of the loop of wire 308. The first and second hooks may be biased apart by a spring or by any other biasing means.

In this configuration, a straight section of the flexible loop of wire 308 is created between the first and second hooks. The manipulation tool 340 has been moved to position the loop of wire 308 in relation to the first 316*a* and second 316*b* electrical terminals.

In this example, the electrical terminals 316 include an upstanding portion 318 which extends in the direction of the movement axis and in a direction radially outward of the voice coil former 302. This makes it easier loop of wire 308 to be held in position relative to the first 316*a* and second 316*b* electrical terminals before it is attached the first 316*a* and second 316*b* electrical terminals.

Figure 4C:
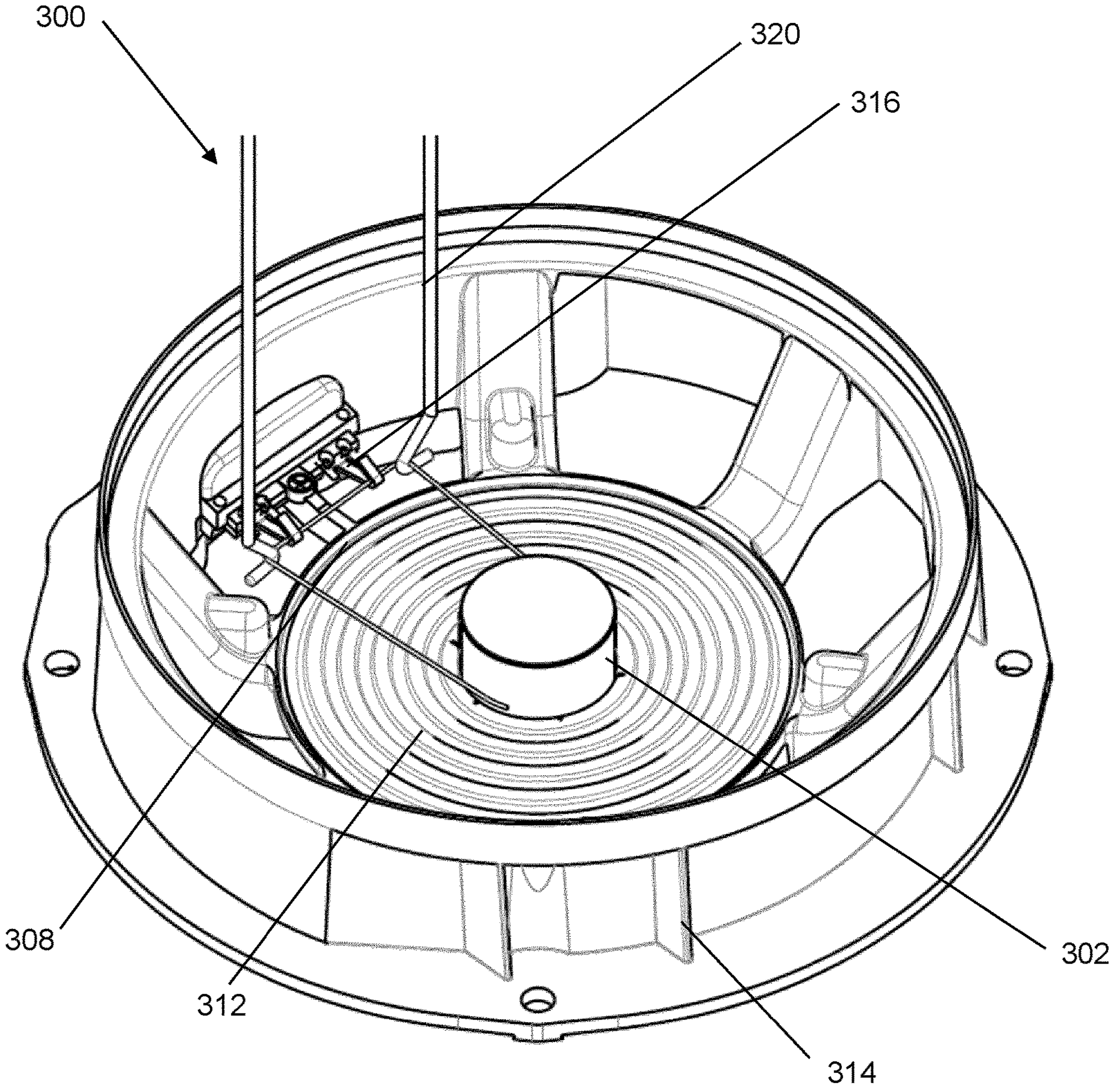

FIG. 4*c* shows the loop of wire 308 being hooked over the aforementioned upstanding portions 318 of the electrical terminals 316.

Figure 4D:
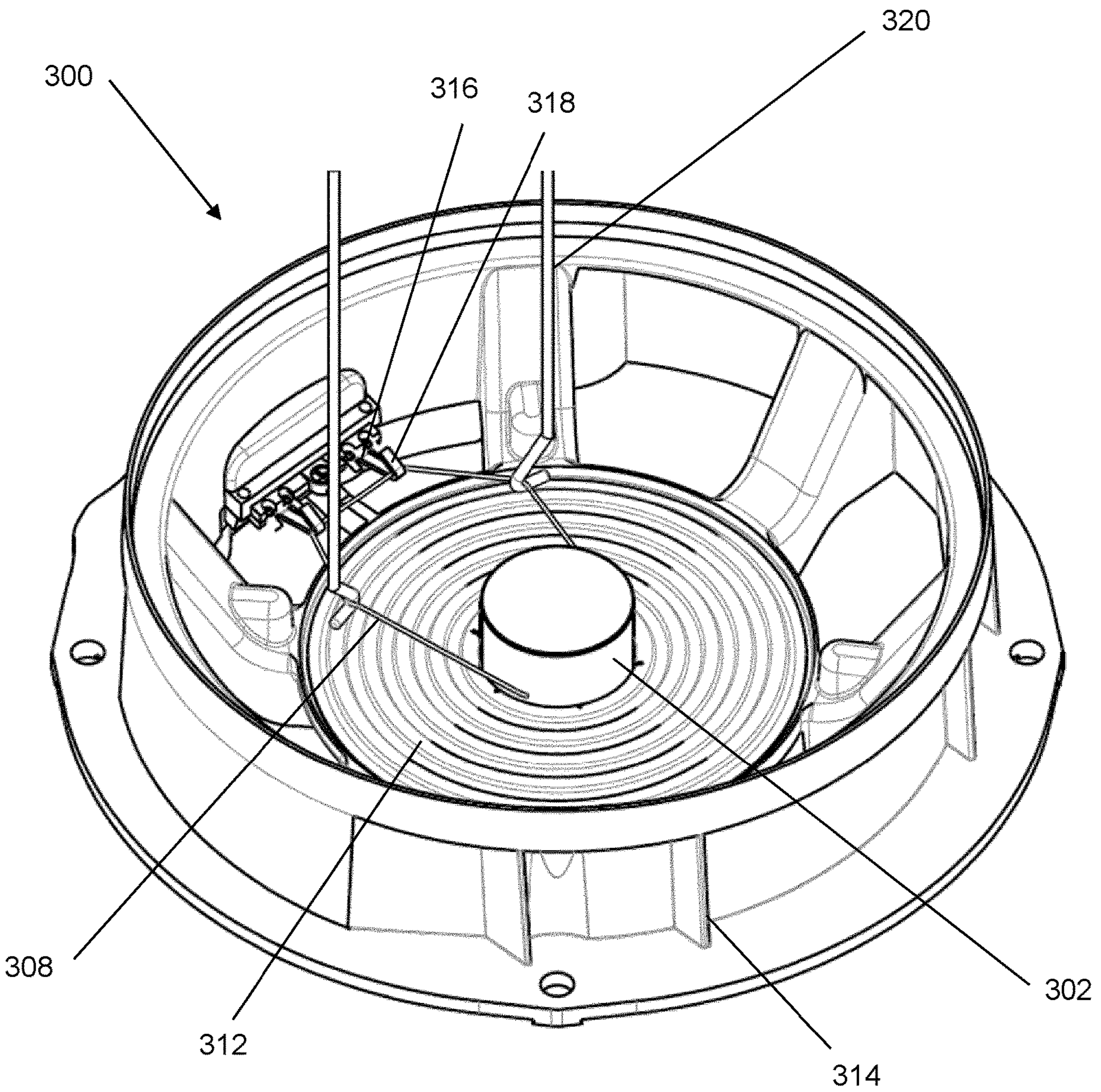

In FIG. 4*d* the manipulation tool 340 is being moved away from the first 316*a* and second 316*b* electrical terminals. The loop of wire 308 is now being held in place by the upstanding portions 318. This allows the manipulation tool 340 to be removed so that there is room to operate inside of the loudspeaker frame 314 and attach the loop of wire 308 to the first 316*a* and second 316*b* electrical terminals.

Figure 4E:
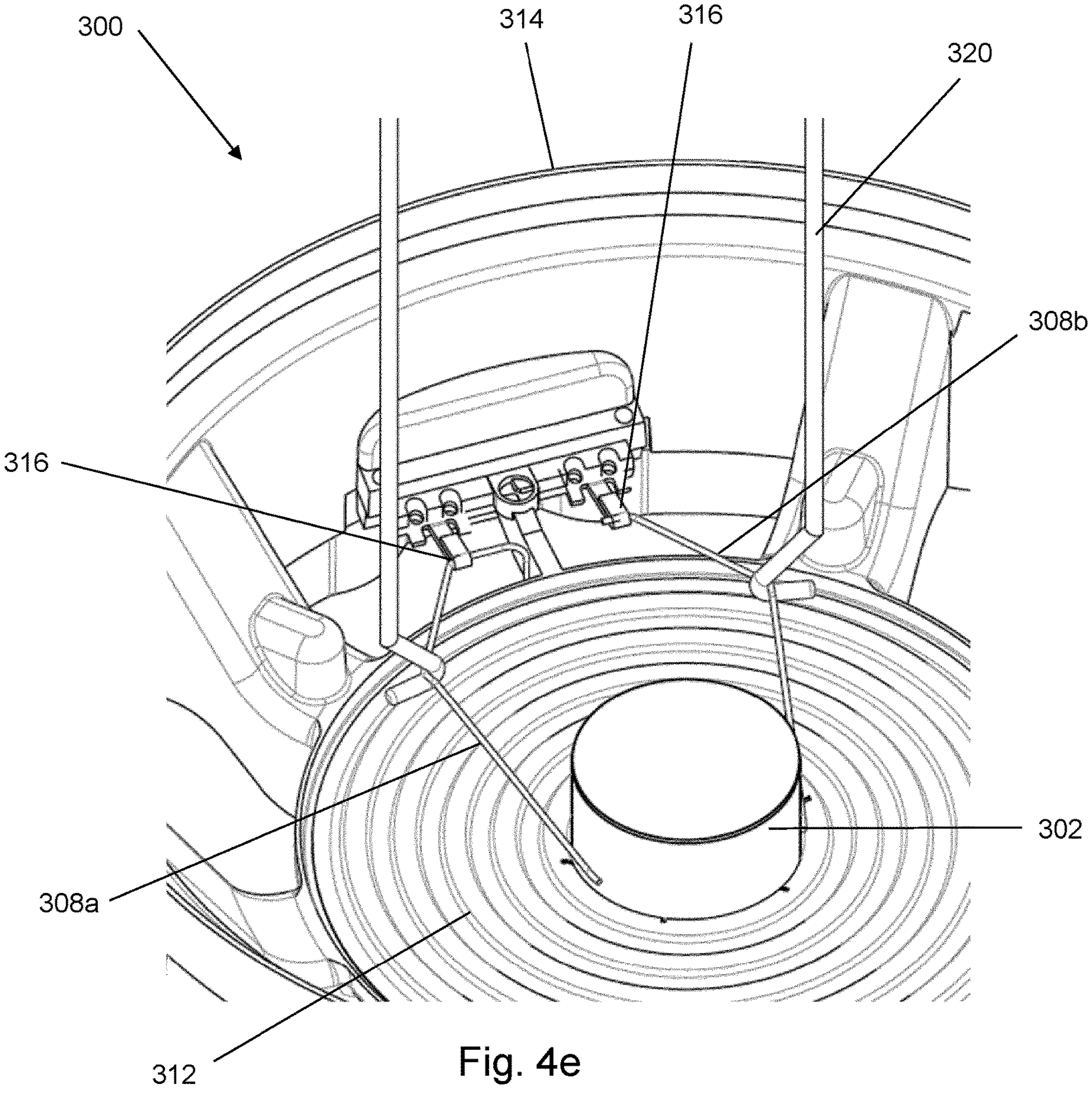

FIG. 4*e* shows a close-up perspective of the loop of wire 308 after it has been attached to the first 316*a* and second 316*b* electrical terminals. In this example, the loop of wire 308 is attached to the first 316*a* and second 316*b* electrical terminals by clamping the upstanding portions 318 around the loop of wire 308 at first and second locations on the loop of wire 308. The loop of wire 308 has been cut between the first and second locations to remove the short circuit over the voice coil. The loudspeaker 300 now comprises two separate lead wires 308 as described previously for FIG. 1.

From this stage the loudspeaker assembly may be completed according to conventional principals. For example, the diaphragm may be mounted to the loudspeaker frame 314 and the voice coil former 302, and a dust cap may be fitted to the diaphragm.

In some examples, the diaphragm may be fitted to the precursor loudspeaker 300 before the loop of wire 308 is attached to the electrical terminals provided there is an opening provided in the loudspeaker to access the loop of wire 308.

Moreover, in some examples the loop of wire 308 may be attached to the electrical terminals 316 by different means. For example, the manipulation tool 340 may remain in place to position the loop of wire 308 relative to the first 316*a* and second 316*b* electrical terminals in place of hooking the loop of wire 308 over upstanding portions 318. The loop of wire 308 may also by soldered or glued in place as opposed to clamping the loop of wire 308.

In some examples, a non-conductive section may be provided in the loop of wire 308 between the first and second locations. This has the benefit of allowing the electrical performance of the voice coil to be measured before it is installed in the loudspeaker and the loop of wire 308 need not necessarily be cut once it has been attached to the electrical terminals.

The manipulation tool 340 may be configured to perform substantially identical movements for each of a plurality of loudspeakers being assembled. In this example, this is facilitated by the tensioning ability of the manipulation tool 340 which can help the manipulating tool 340 to accurately position different loops of wire 308 in relation to the terminals 316, even if the loops of wire have 308 different lengths or positions, e.g. due to manufacturing tolerances.

In this way, the assembly of a loudspeaker with lead wires involves a lower part count since only one loop of wire 308 need to be provided and the process can be made more automated and efficient.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

REFERENCES

A number of publications are cited above in order to more fully describe and disclose the invention and the state of the art to which the invention pertains. Full citations for these references are provided below. The entirety of each of these references is incorporated herein.

JP3596121B2
U.S. Pat. No. 9,674,595B2

The invention claimed is:

1. A method of assembling a loudspeaker, the method including:

providing a precursor loudspeaker that includes:

a chassis, including a first electrical terminal and a second electrical terminal; and a voice coil former, wherein a voice coil is mounted on the voice coil former, wherein a first end of a flexible wire is attached to the voice coil former and electrically connected to a first end of the voice coil, and a second end of the flexible wire is attached to the voice coil former and electrically connected to a second end of the voice coil such that the flexible wire forms a loop of wire which extends outwardly from the voice coil former; and then attaching the loop of wire to the first electrical terminal at a first location on the loop of wire and attaching the loop of wire to the second electrical terminal at a second location on the loop of wire.

2. The method of claim 1 further comprising cutting the loop of wire between the first and second locations on the loop of wire after attaching the loop of wire to the first and second electrical terminals.

3. The method of claim 1 further comprising adapting the flexible wire such that the loop of wire comprises a non-conductive section of wire between the first and second locations.

4. The method of claim 1 wherein attaching the loop of wire to the first electrical terminal at the first location on the loop of wire and attaching the loop of wire to the second electrical terminal at the second location on the loop of wire includes:

(i) positioning the loop in relation to the first and second electrical terminals such that the loop of wire is in contact with the first electrical terminal at the first location on the loop of wire and such that the loop of wire is in contact with the second electrical terminal at the second location on the loop of wire; and (ii) attaching the loop of wire to the first electrical terminal at the first location on the loop of wire to form an electrical connection between the loop of wire and the first electrical terminal, and attaching the loop of wire to the second electrical terminal at the second location on the loop of wire to form an electrical connection between the loop of wire and the second electrical terminal.

5. The method of claim 4 wherein positioning the loop in relation to the first and second electrical terminals is performed using a manipulation tool.

6. The method of claim 5 wherein the manipulation tool is configured to apply tension to the loop of wire when positioning the loop in relation to the first and second electrical terminals.

7. The method claim 6 wherein positioning the loop in relation to the first and second electrical terminals includes inserting at least a portion of the manipulation tool into the loop of wire and then using the manipulation tool to manipulate the loop of wire, wherein:

when the manipulation tool is being inserted into the loop of wire the manipulation tool is held in an insertion configuration, and when manipulating tool is manoeuvring the loop of wire is it in a tensioning configuration.

8. The method claim 7 wherein when the manipulation tool is in the insertion configuration, the maximal width of the portion of the manipulation tool inserted into the loop of wire as measured in a direction perpendicular to the movement axis is smaller than when the manipulation tool is in the tensioning configuration.

9. The method of claim 8 wherein when the manipulation tool is in the insertion configuration, the maximal width of the portion of the manipulation tool inserted into the loop of wire as measured in the direction perpendicular to the movement axis is smaller than the maximal width of the voice coil former as measured in the same direction.

10. The method of claim 5 wherein the manipulation tool includes a first hook and a second hook.

11. The method of claim 10 wherein the first and second hooks are biased apart from each other by a biasing means such that the manipulation tool is configured to apply a predetermined tension to the loop of wire.

12. The method of claim 1 wherein the first and second electrical terminals include a respective upstanding portion extending at least partly in the direction of the movement axis of the loudspeaker and positioning the loop in relation to the first and second electrical terminals includes manoeuvring the loop of wire over the respective upstanding portions.

13. The method of claim 12 wherein the loop of wire is manoeuvred over the respective upstanding portion of the first electrical terminal and the respective upstanding portion of the second electrical terminal at the same time.

14. The method of claim 12 wherein the respective upstanding portions of the first and second electrical terminal also extend in a radially outward direction with respect to the movement access.

15. A voice coil former for use in the method of claim 1, wherein the voice coil is mounted on the voice coil former, wherein the first end of the flexible wire is attached to the voice coil former and electrically connected to the first end of the voice coil, and the second end of the flexible wire is attached to the voice coil former and electrically connected to the second end of the voice coil such that the flexible wire forms the loop of wire which extends outwardly from the voice coil former.

* * * * *